(12) United States Patent  
Higashi

(10) Patent No.: US 7,392,947 B2  
(45) Date of Patent: Jul. 1, 2008

(54) NONCONTACT TAG, CONTROL METHOD THEREFOR AND NONCONTACT ID IDENTIFICATION SYSTEM

(75) Inventor: Noriyuki Higashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 309 days.

(21) Appl. No.: 11/360,587

(22) Filed: Feb. 24, 2006

(65) Prior Publication Data

US 2007/0075143 A1   Apr. 5, 2007

(30) Foreign Application Priority Data

Sep. 30, 2005   (JP)   ............................. 2005-289340

(51) Int. Cl.  
*G06K 7/00* (2006.01)

(52) U.S. Cl. ........................ 235/449; 235/380; 235/451; 235/493; 375/324

(58) Field of Classification Search ................. 235/380, 235/451, 449, 476, 492, 493; 375/324  
See application file for complete search history.

(56) References Cited

U.S. PATENT DOCUMENTS 5,444,222 A * 8/1995 Inoue ......................... 235/380  
5,864,588 A   1/1999 Miyamoto  
6,886,752 B2 * 5/2005 Murayama et al. .......... 235/492  
2005/0087599 A1 * 4/2005 Ward et al. .................. 235/451

FOREIGN PATENT DOCUMENTS

| JP | 2000-172806 A | 6/2000 |
| JP | 2003-283366 A | 10/2003 |
| JP | 2003-333112 A | 11/2003 |

\* cited by examiner

*Primary Examiner*—Seung H Lee  
(74) *Attorney, Agent, or Firm*—Arent Fox LLP

(57) ABSTRACT

The present invention is to provide a noncontact tag, comprising: a clock extraction unit for extracting a clock from a received carrier wave; a demodulation unit for outputting a demodulated signal comprising a logic signal whose logic state changes responding to each of a non-modulation period and modulation period of the carrier wave; a division unit for generating a division clock from the clock input from the clock extraction unit and also restraining the division clock from being output according to a logic state of the demodulated signal; and a decoding unit for decoding information included in the carrier wave by using a value of counter driven by the division clock.

17 Claims, 11 Drawing Sheets

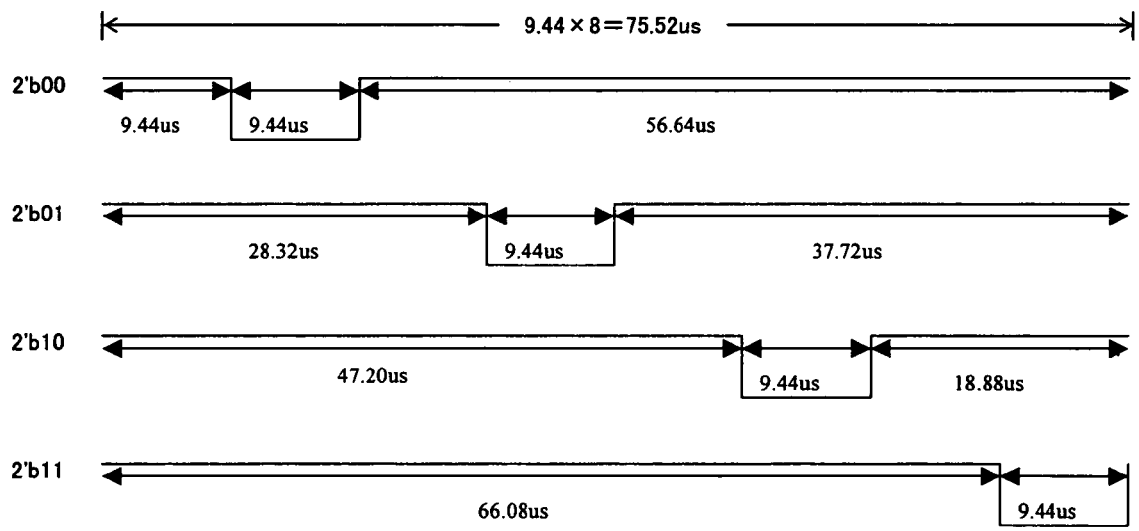
F I G. 1

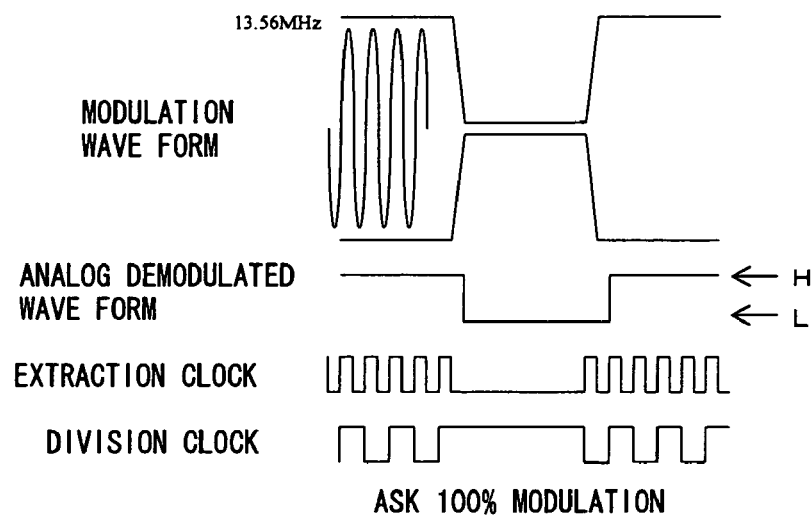
F I G. 2 A
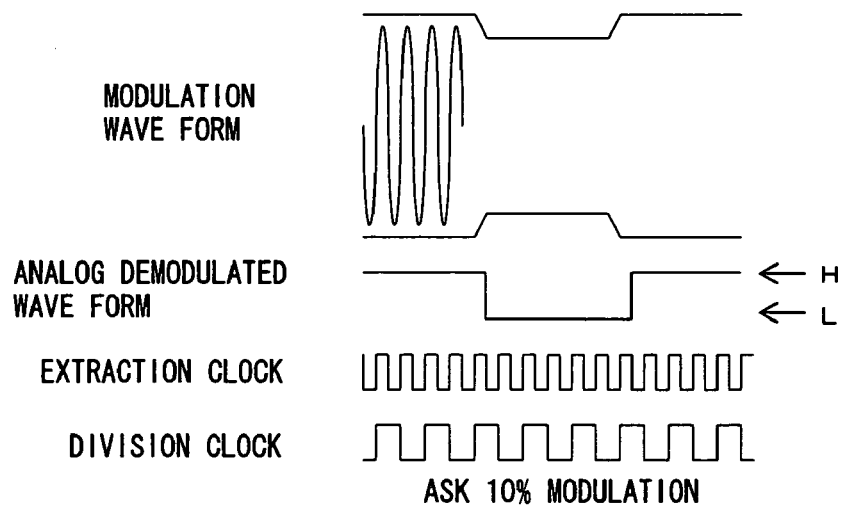
F I G. 2 B

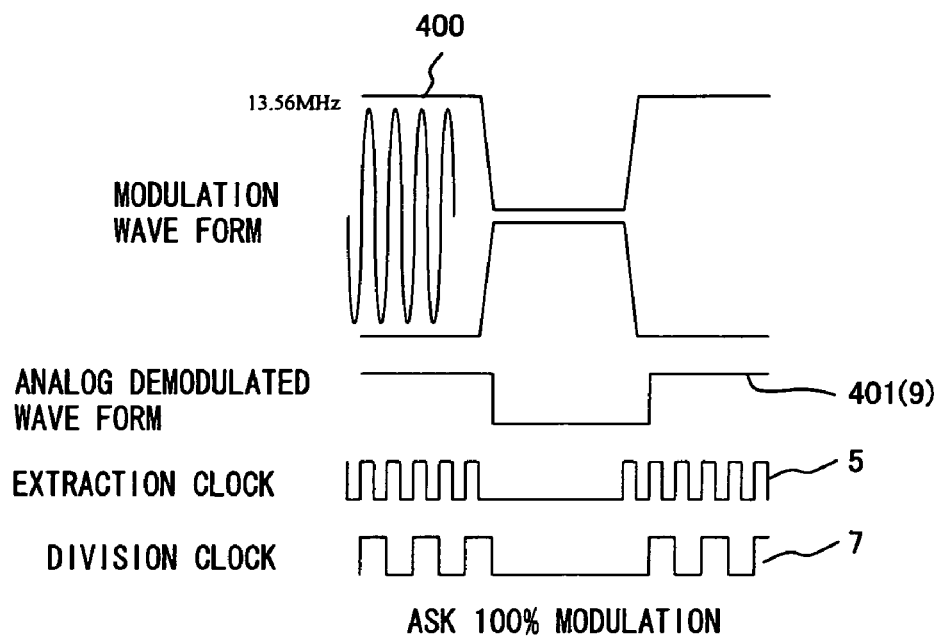
F I G. 6 A
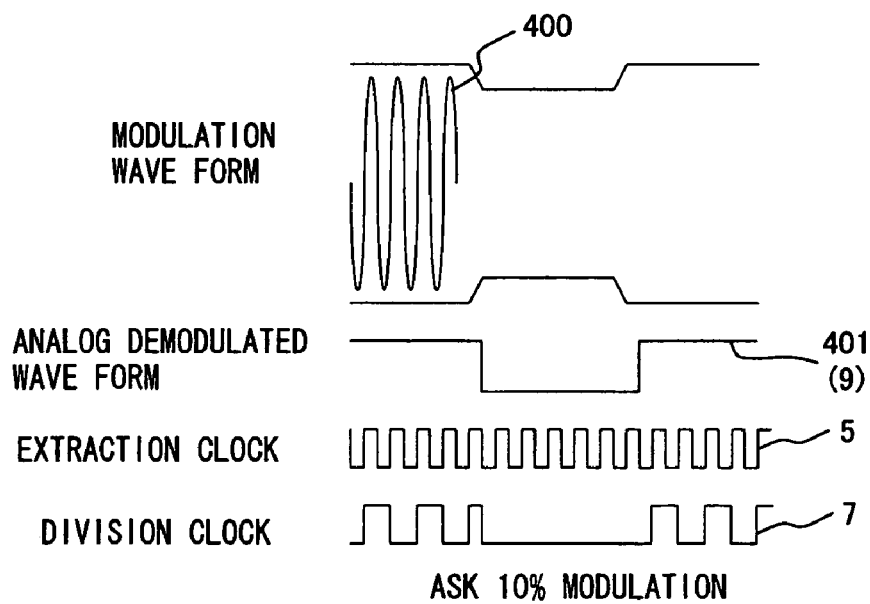
F I G. 6 B

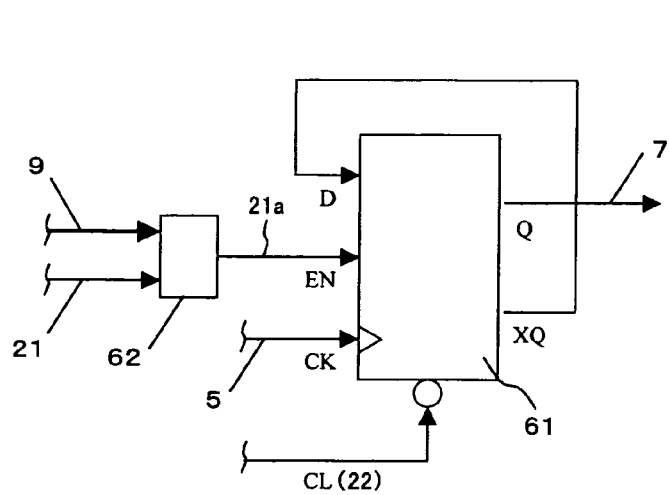
F I G. 8 A
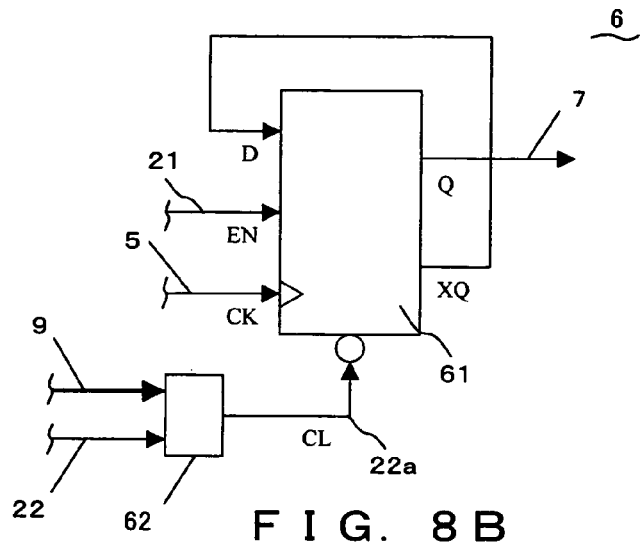
F I G. 8 B
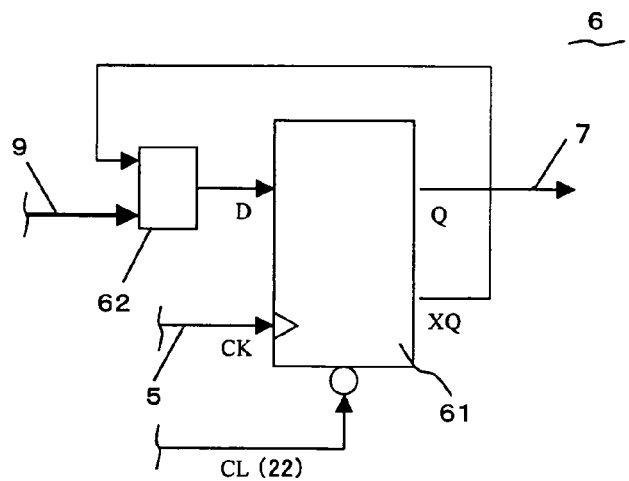
F I G. 8 C

NONCONTACT TAG, CONTROL METHOD THEREFOR AND NONCONTACT ID IDENTIFICATION SYSTEM

CROSS-REFERENCE TO RELATED APPLICATIONS

This application is based upon and claims the benefit of priority from the prior Japanese Patent Application No. 2005-289340 filed on Sep. 30, 2005, the entire contents of which are incorporated herein by reference.

BACKGROUND OF THE INVENTION

1. Field of the Invention

The present invention relates to a noncontact tag, control method therefor and noncontact ID identification system, and in particular to a technique effectively applicable to a passive noncontact tag which is operated by a received radio wave power, its control technique and its application system.

2. Description of the Related Art

In recent years, a noncontact type ID identification system has been in the spotlight for applications, for example, to a supply chain management (SCM), logistics management, inventory management, et cetera. That is, a system for automatically identifying a subject by a reader/writer connected to a computer reading, by way of a radio wave, identifier information of a transponder (i.e., a noncontact tag) attached to a moving body such as a person or a thing.

A representative standard for the noncontact ID system includes the ISO 14443 type-A, ISO 15693 (both of which are 13.56 MHz frequency), the ISO 18000-6 type-A (up to 900 MHz frequency), et cetera.

A proximity type, i.e., ISO 14443, and a neighborhood type, i.e., ISO 15693, are electromagnetic induction systems which enable a noncontact communication between a reader/writer and IC card or noncontact tag. Although the standards are different, basic configurations of the IC card and the tag are as known by disclosures of patent documents 1 and 2.

That is, a conceivable configuration comprises an antenna (i.e., a loop type) for receiving a radio wave (called a "carrier" hereinafter) from a reader/writer, a power supply circuit for generating power from the received carrier, a clock circuit for extracting a clock necessary for operating an IC card built-in circuit (i.e., an LSI) from the carrier, a clock division circuit for dividing the clock into a frequency used by internal logic, et cetera, a demodulation circuit for demodulating a modulated carrier, a modulation circuit for responding back to the reader/writer, a nonvolatile memory for storing received information, et cetera, and a control circuit for controlling the nonvolatile memory and processing transmission & receiving data.

Although the antenna form is a dipole type for a communication system in a UHF band (up to 900 MHz) specified by the ISO 18000-6 because of a microwave system, the internal basic configuration of an LSI is approximately the same.

In the ISO 14443 type-A and ISO 15693, an ASK (amplitude shift keying) 100% modulation in the modulation system for transmission data from a reader/writer to a transponder. A period for modulating transmission data by the ASK 100% modulation stops the carrier (13.56 MHz in this case) from the reader/writer.

Since an internal clock necessary for operating an LSI is commonly extracted from a carrier from the reader/writer and a clock cannot be extracted from the carrier when receiving ASK 100% modulation data due to the above described reason, thereby stopping the internal clock of the LSI and operations becoming discontinuous every time the ASK 100% modulation data is received.

A conceivable countermeasure to avoid the clock stoppage is mounting a clock generation circuit such as a PLL (phase locked loop), et cetera, it is not preferred, however. The reason is that a characteristic of longer communication distance is required than the both standards which have different communication distances, i.e., approximately 10 cm as per ISO 14443 and approximately 70 cm as per ISO 15693. In order to extend the communication distance, a power consumption of an LSI is necessary to reduce and therefore a large power consumption required by a clock generation circuit such as the above described PLL, et cetera, is not preferable to equip for an LSI.

There actually exists an LSI as per the ISO 14443 type-A, which only uses a clock extracted from a clock extraction circuit, in lieu of equipping a clock generation circuit such as a PLL.

In the meantime, the ISO 15693 standard specifies a data receiving by an ASK 10% modulation along with the ASK 100% modulation. A reader/writer transmits a command according to the encoding shown by FIG. 1 per the ISO 15693. The encoding does not depend on a modulation index. Although the encoding does not depend on a modulation index, an ASK 100% modulation and an ASK 10% modulation produce different results at the time of demodulation in the demodulated signals, extracted signals and divided clocks (i.e., a clock used for logic) at the LSI over on a command receiver as shown by FIGS. 2A and 2B. Because of this, the same decoding circuit cannot recognize as the same data due to a clock difference.

The following exemplifies a decoding of an encoding according to the ISO 15693 as a decoding method. An m-bit bit string is expressed by an "m'b00 , , , 0" in the following description.

Let it assume transmission data as "4' b0100" (i.e., 4-bit bit string). Since it is transmitted as LSB first according to the ISO 15693, a "2' b00" is sent first followed by a "2' b01". 2-bit data is sent by a data frame of a 75.52-microsecond time width.

As shown by FIGS. 2A and 2B, an analog demodulation wave forms change both in the ASK100% modulation and ASK10% modulation between a non-modulation period in which a carrier amplitude changes and a modulation period in which the carrier amplitude changes, resulting in becoming an H level during the non-modulation period and an L level during the modulation period.

Let it first show a method for decoding by detecting a position of a modulation period (i.e., an L level). This method falls under the category of the pulse pause encoding (i.e., 1 out of 4, 1 out of 256 according to ISO 15693) for example.

A data decoding uses a decoding circuit disposed for judging 2-bit data transmitted based on a counter and counter value disposed for detecting a position of the L level. A data processing unit carries out a logic processing based on output data from the decoding unit.

FIG. 3 shows a demodulation signal, extracted clock, division clock and decoding-use counter value which are after demodulating modulated data, with the upper side showing the case of ASK 100% modulation and the lower side showing the case of ASK 10% modulation.

A division clock cycle generates a 9.44-microsecond clock, which is the same cycle as the pulse width, from the division circuit. The decoding-use counter can use a 3-bit flip-flop operated by the division clock.

In the case of the ASK 10% modulation shown by the lower side of FIG. 3, a division clock can be output because a clock can be extracted from a carrier both at non-modulation time (period) and at modulation time (period). The division clock enables the 3-bit decoding-use counter to count from zero (0) to seven (7) in 75.52 microseconds during a 2-bit period. From the relationship between a count value of the decoding-use counter and an L-level position of the demodulation signal, decoding of transmission data is enabled. It is appropriate to design a decoding circuit so that received data is "2' b00" at the time of the decoding-use counter being zero (0), and received data is "2' b01" at the time of the decoding-use counter being two (2), when the demodulation signal becomes an L level (which is equivalent to a data receiving).

On the other hand, in the case of the ASK 100% modulation shown by the upper side of FIG. 3, a clock cannot be extracted during a modulation period when data is modulated because the signal level of a carrier becomes zero (0), and therefore a division clock also stops. Consequently, when the three-bit counter counts up to six, it transits to the next data frame at the ASK 100% modulation. Provided that there is only the ASK 100% modulation, a decoding is possible from the relationship between a count value and demodulation signal, if the three-bit counter is set up for counting from zero (0) up to six (6).

However, the problem is that the positional relationship between a count value of the three-bit counter and the L level of the demodulation signal shifts with a modulation index if the same decoding circuit carries out an ASK 10% and ASK 100%.

Next, let it show a method for decoding the same pulse pause-encoded data by detecting a period of a demodulation signal being at H level (i.e., a non-modulation period) by referring to FIG. 4. The assumption is that the division clock cycle is the same 9.44 microseconds as described above.

A decoding-use counter is assumed to have a four-bit width in the case of this system. The decoding-use counter resets at "4' b00" when detecting an L level of a demodulation signal. It is assumed that the first data is judged as "2' b00". This is established if decoding start from the first data of a command.

Next is to count an H level period of the second demodulation signal until an L level by using the decoding-use counter. In the case of the ASK 10% modulation shown by the lower side of FIG. 4, a counter value of the decoding-use counter is nine (9). Here, the second data is understood as "2b' 01" from the facts of the first data being "2b' 00" and the count value being nine (9). This combination can be identified from the coding wave form shown by FIG. 1. If the count values of the decoding-use counter are 7, 11 and 13 at the time of the demodulation signal becoming L level, the second data are judged as "2'b 00", "2'b 10" and "2' b 11", respectively. In the case of the ASK 10% modulation, it is possible to decode as described above, in the case of the ASK 100% modulation shown by the lower side of FIG. 4, however, the value of the decoding-use counter becomes different as in the case of the above described system, as shown by FIG. 3, which detects an L level position. Although a decoding is possible by a single modulation method, a problem cannot be avoided if signals of two modulation index coexist.

Accordingly, a double equipment of a decoding circuit and a demodulation circuit corresponding to each of different modulation index solves the problem for both cases of the decoding systems as disclosed by the patent document 1, this method, however, is not preferred because power consumption, logic size and area size of a chip increase and accordingly the associated cost increases.

Meanwhile, a patent document 2 has disclosed a technique for attempting to enable a modulation of normal data by a demodulation circuit presetting, in a counter circuit, a clock value equivalent to a pause period in which a demodulation clock stops as a result of the amplitude of a received radio wave becoming zero (0) by modulation in a demodulation circuit for demodulating ASK 100% modulation data, which also brings about a technical problem of a power consumption and size of logic because there is a necessity of adding the function of presetting a counter value to the demodulation circuit.

[Patent document 1] laid-open Japanese patent application publication No. 2000-172806

[Patent document 2] laid-open Japanese patent application publication No. 2003-333112

SUMMARY OF THE INVENTION

A purpose of the present invention is to reduce a power consumption of a noncontact tag at the time of receiving modulated data coexisting with a carrier.

Another purpose of the present invention is to provide a technique enabling an accurate demodulation of modulated data by different modulation system without ushering in an increased circuit size or power consumption, or a reduced communication distance, to a noncontact tag.

A first aspect of the present invention is to provide a noncontact tag, comprising: a clock extraction unit for extracting a clock from a received carrier wave; a demodulation unit for outputting a demodulated signal comprising a logic signal whose logic state changes responding to each of a non-modulation period and modulation period of the carrier wave; a division unit for generating a division clock from the clock input from the clock extraction unit and also restraining the division clock from being output according to a logic state of the demodulated signal; and a decoding unit for decoding information included in the carrier wave by using a value of counter driven by the division clock.

A second aspect of the present invention is to provide the noncontact tag according to the first aspect, wherein the decoding unit decodes the information by detecting a position of the modulation period in a data frame of a predetermined time width by the counter value.

A third aspect of the present invention is to provide the noncontact tag according to the first aspect, wherein the decoding unit decodes the information by detecting a length of the non-modulation period by the counter value.

A fourth aspect of the present invention is to provide the noncontact tag according to the first aspect, wherein the carrier wave carries the information by either a modulation factor 100% or a modulation factor 10%, and transitions of the counter values identify with each other in the modulation factor 100% and modulation factor 10% for the same information.

A fifth aspect of the present invention is to provide the noncontact tag according to the first aspect, wherein the carrier wave carries the information by either a 100% amplitude modulation or 10% amplitude modulation, and restrains the division clock from outputting during a period of an amplitude being modulated by the 100% amplitude modulation and during a period of an amplitude being modulated by the 10% amplitude modulation.

A sixth aspect of the present invention is to provide the noncontact tag according to the first aspect, wherein the division unit comprises a flip-flop, by receiving the clock as an input, for outputting the division clock from a Q terminal by feeding back an output from an XQ terminal to a D terminal, and an logic gate for inputting to an enable (EN) terminal of the flip-flop by carrying out an logic operation of the demodulated signal and enable signal; and makes the division clock stopped according to a logic state of the demodulated signal.

A seventh aspect of the present invention is to provide the noncontact tag according to the first aspect, wherein the division unit comprises a flip-flop, by receiving the clock as an input, for outputting the division clock from a Q terminal by feeding back an output from an XQ terminal to a D terminal, and an logic gate for inputting to a clear (CL) terminal of the flip-flop by carrying out an logic operation of a clear signal of the flip-flop and the demodulated signal; and makes the division clock stopped according to a logic state of the demodulated signal.

An eighth aspect of the present invention is to provide the noncontact tag according to the first aspect, wherein the division unit comprises a flip-flop, by receiving the clock as an input, for outputting the division clock from a Q terminal by feeding back an output from an XQ terminal to a D terminal, and an logic gate for inputting to a D terminal of the flip-flop by carrying out an logic operation of an output of the XQ terminal and the demodulated signal; and makes the division clock stopped according to a logic state of the demodulated signal.

A ninth aspect of the present invention is to provide the noncontact tag according to the first aspect is a passive type noncontact tag further comprising a rectifier unit for extracting a direct current from the carrier wave.

A tenth aspect of the present invention is to provide a control method for a noncontact tag, comprising the steps of extracting a clock from a received carrier wave; outputting a demodulated signal comprising a logic signal whose logic state changes responding to each of a non-modulation period and modulation period of the carrier wave; restraining the division clock from being output according to a logic state of the demodulated signal when generating a division clock from the clock input from a clock extraction unit; and decoding information included in the carrier wave by using a count value of the division clock.

An eleventh aspect of the present invention is to provide the control method for a noncontact tag according to the tenth aspect, wherein the step of decoding the information is to decode the information by detecting a position of the modulation period within a data frame of a predetermined time width by the count value.

A twelfth aspect of the present invention is to provide the control method for a noncontact tag according to the tenth aspect, wherein the step of decoding the information is to decode the information by detecting a length of the modulation period by the count value.

A thirteenth aspect of the present invention is to provide the control method for a noncontact tag according to the tenth aspect, wherein the carrier wave carries the information by either a 100% modulation factor or a 10% modulation factor, and transitions of the counter values identify with each other in the modulation factor 100% and modulation factor 10% for the same information in the step of decoding the information.

A fourteenth aspect of the present invention is to provide a noncontact ID identification system including an access apparatus for transmitting command information by way of an ASK modulated carrier wave and a noncontact tag for responding to the access apparatus with identifier information by receiving the command information, wherein the noncontact tag includes a clock extraction unit for extracting a clock from the carrier wave received from the access apparatus; a demodulation unit for outputting a demodulated signal comprising a logic signal whose logic state changes responding to each of a non-modulation period and modulation period of the carrier wave; a division unit for generating a division clock from the clock input from the clock extraction unit and also restraining the division clock from being output according to a logic state of the demodulated signal; and a decoding unit for decoding information included in the carrier wave by using a value of counter driven by the division clock.

A fifteenth aspect of the present invention is to provide the noncontact ID identification system according to the fourteenth aspect, wherein the access apparatus transmits the command information by modulating the carrier wave by a modulation factor 100% or modulation factor 10%.

A sixteenth aspect of the present invention is to provide the noncontact ID identification system according to the fourteenth aspect, wherein the decoding unit decodes the information by detecting a position of the modulation period within a data frame of a predetermined time width by the count value.

A seventeenth aspect of the present invention is to provide the noncontact ID identification system according to the fourteenth aspect, wherein the decoding unit decodes the information by detecting a length of the non-modulation period by the counter value.

The above described present invention enables a reduction of power consumption at the time of receiving by making a division clock generated from a clock which is extracted from a carrier wave stopped during a modulation period for example.

Also enabled is an acquisition of accurate communication information by accurately demodulating, and decoding, a modulated carrier wave in either of modulation systems, i.e., the case of a modulation system in which the clock extracted from a carrier wave is interrupted during a modulation period such as the ASK 100% modulation and the case of a modulation system in which the clock extracted from a carrier wave is not interrupted during a modulation period such as the ASK 10% modulation.

Meanwhile, preventing from occurring are problems such as an increased circuit size or power consumption and a decreased communication distance as in the case of multiply equipping a demodulation circuit for each of different modulation system as disclosed by the patent document 1 or in the case of adding a PLL or a preset circuit for a counter value for the purpose of compensating for a clock that is interrupted during a modulation period as disclosed by the patent document 2.

According to the present invention, the configuration is to stop the clock also in the ASK 10% modulation, since the time for becoming an L level (i.e., the time for modulation) during a predetermined period is the same between the ASK100% modulation and the ASK 10% modulation.

BRIEF DESCRIPTION OF THE DRAWINGS

FIG. 1 is a wave form diagram exemplifying a coding wave form within ISO15693, for use in a noncontact ID identification system which includes a noncontact tag according to an embodiment of the present invention;

FIG. 2A is a conceptual diagram showing an operation of a conventional noncontact tag in the case of an ASK 100% modulation;

FIG. 2B is a conceptual diagram showing an operation of a conventional noncontact tag in the case of an ASK10% modulation;

FIG. 6A is a conceptual diagram exemplifying an operation of a noncontact tag in the case of an ASK 100% modulation according to an embodiment of the present invention;

FIG. 6B is a conceptual diagram exemplifying an operation of a noncontact tag in the case of an ASK 10% modulation according to an embodiment of the present invention;

FIG. 8A is a block diagram exemplifying in more detail a part of configuration of a noncontact tag according to an embodiment of the present invention;

FIG. 8B is a block diagram exemplifying in more detail a part of configuration of a noncontact tag according to an embodiment of the present invention;

FIG. 8C is a block diagram exemplifying in more detail a part of configuration of a noncontact tag according to an embodiment of the present invention;

DESCRIPTION OF THE PREFERRED EMBODIMENTS

The following is a detailed description of the preferred embodiment of the present invention while referring to the accompanying drawings.

Figure 5:
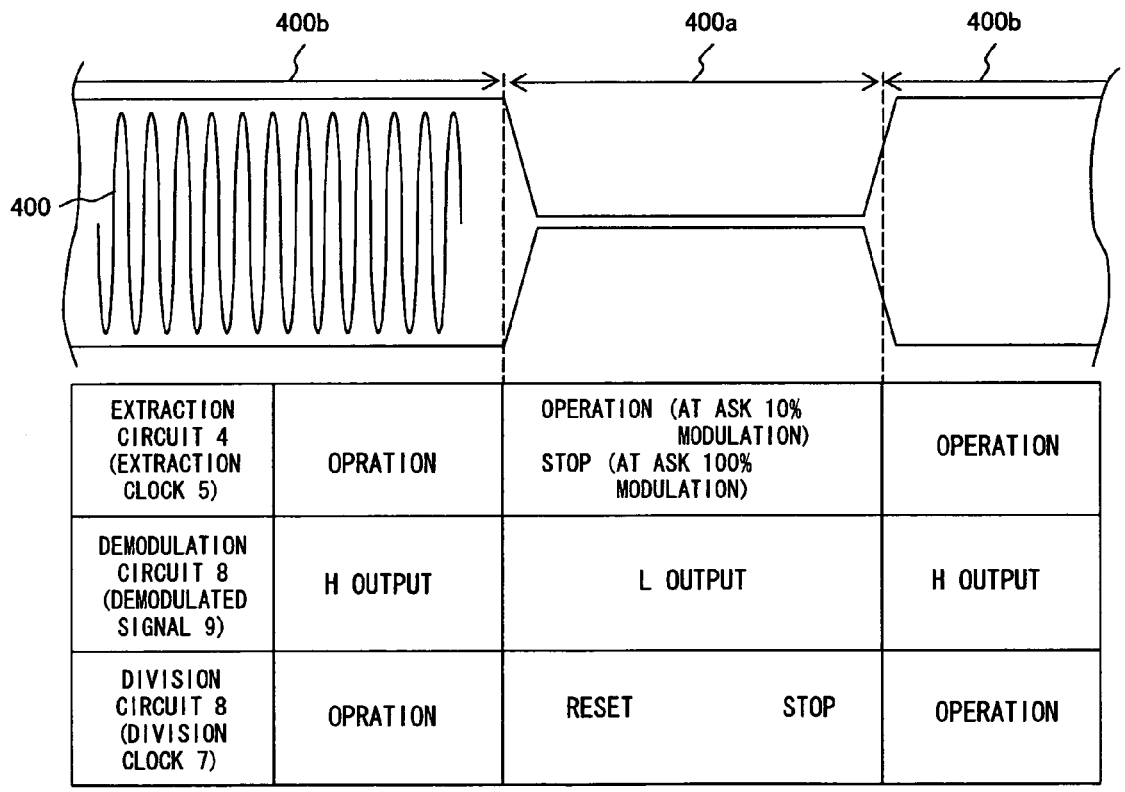
FIG. 5 is a conceptual diagram exemplifying an operation of a noncontact tag according to an embodiment of the present invention.
Figure 7:
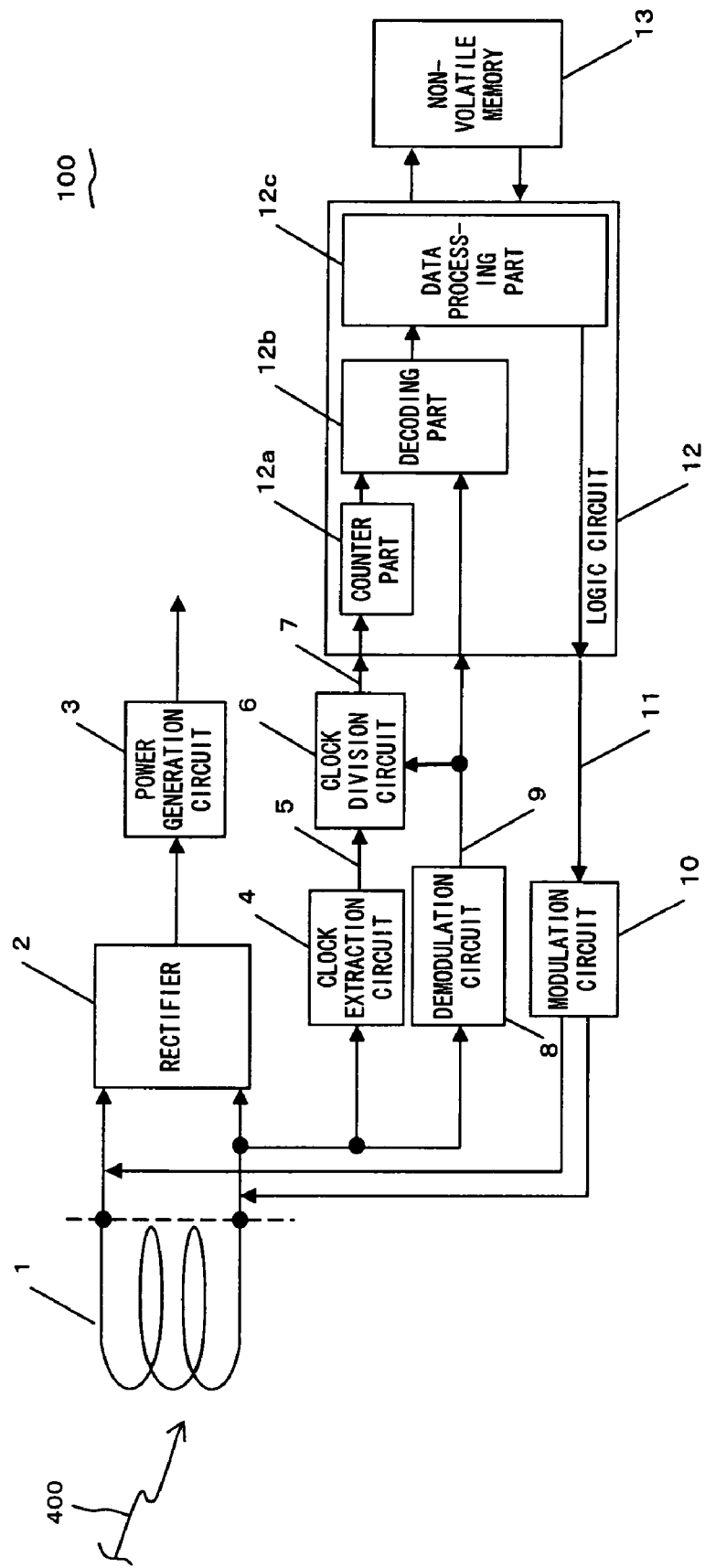
FIG. 7 is a block diagram exemplifying a configuration of a noncontact tag according to an embodiment of the present invention.
Figure 9:
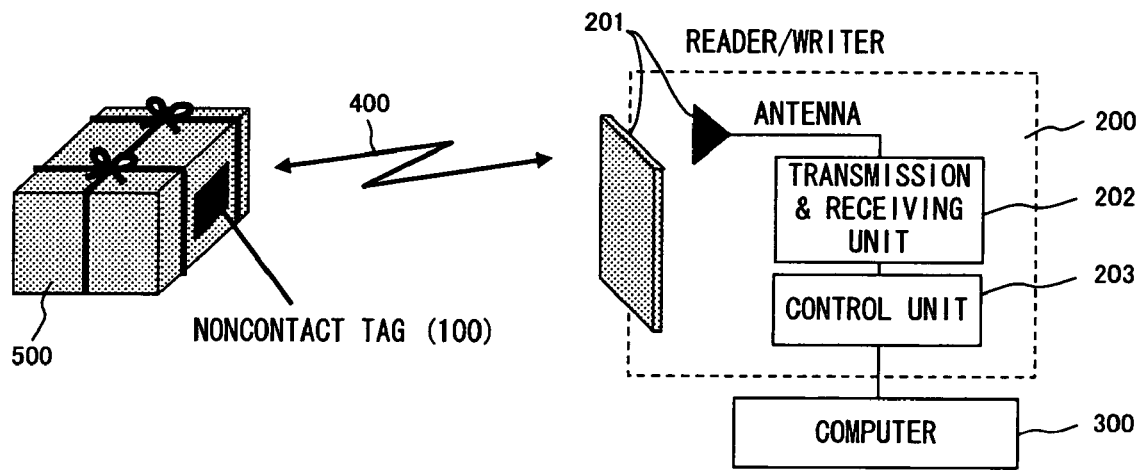
FIG. 9 is a conceptual diagram exemplifying a configuration of a noncontact ID identification system using a noncontact tag according to an embodiment of the present invention.

FIGS. 5, 6A and 6B are conceptual diagrams exemplifying an operation of a noncontact tag according to an embodiment of the present invention; FIG. 7 is a block diagram exemplifying a configuration of a noncontact tag according to the present embodiment; and FIGS. 8A, 8B and 8C is a block diagram exemplifying in more detail a part of configuration of a noncontact tag according to the present embodiment. And FIG. 9 is a conceptual diagram exemplifying a configuration of a noncontact ID identification system using a noncontact tag according to the present embodiment.

A noncontact ID identification system according to the present embodiment includes an on contact tag 100, a reader/writer 200 and an information processing apparatus 300.

The noncontact tag 100 is attached for example to a moving body such as a pack 500 and internally stores unique identifier information (ID).

The reader/writer 200 includes an antenna 201, a transmission & receiving unit 202 and a control unit 203.

The antenna 201 is used for transmitting and receiving a carrier 400 (i.e., a carrier wave) such as a radio wave between the reader/writer 200 and the noncontact tag 100.

The transmission & receiving unit 202 carries out a modulation processing in order to load necessary information onto the carrier 400 for transmitting to the noncontact tag 100, a processing of reproducing communication information from the carrier 400 which comes in from the noncontact tag 100 by a demodulation processing, et cetera.

The control unit 203 controls the above described modulation processing and demodulation processing at the transmission & receiving unit 202.

By this configuration, the reader/writer 200 carries out the processings of transmitting to the information processing apparatus 300 by reading unique identifier information stored by the noncontact tag 100 and writing information instructed by the information processing apparatus 300 in the noncontact tag 100 by exchanging information therewith by way of a carrier 400 such as a radio wave based on an instruction from the information processing apparatus 300.

The information processing apparatus 300 recognizes the pack 500 attached by the noncontact tag 100 and carries out a desired processing based on unique identifier information read out of the aforementioned noncontact tag 100 by using the reader/writer 200.

As exemplified by FIG. 7, the noncontact tag 100 according to the present embodiment includes an antenna 1, a rectifier 2, a power generation circuit 3, a clock extraction circuit 4, a clock division circuit 6, a demodulation circuit 8, a modulation circuit 10, a logic circuit 12 and a nonvolatile memory 13.

The noncontact tag 100 can comprise one chip LSI (large scale integrated circuit) for example.

The antenna 1 is used for transmitting and receiving a carrier 400 such as a radio wave between itself and the reader/writer 200. Although FIG. 7 exemplifies a loop type for the antenna 1, it may use a dipole type, et cetera, depending on a frequency of the used carrier 400.

The rectifier 2 rectifies a high frequency current of the carrier 400 received at the antenna 1 and input to the power generation circuit 3 as a DC current.

The power generation circuit 3 distributes the DC current obtained from the rectifier 2 to respective components within the noncontact tag 100 as the operating power.

That is, the noncontact tag 100 according to the present embodiment is a passive type noncontact tag operating on the operating power obtained from the carrier 400.

The clock extraction circuit 4 extracts an extraction clock 5 necessary for operating the aforementioned noncontact tag 100 from the carrier 400.

The clock division circuit 6 divide the extraction clock 5 into a frequency actually used for the logic circuit 12, et cetera.

The demodulation circuit 8 demodulates a modulated carrier 400.

The modulation circuit 10 carries out the modulation processing for the purpose of making the carrier 400 attach itself with response information 11 responded back to the reader/writer 200 from the noncontact tag 100.

The nonvolatile memory 13 is a storage medium such as an FRAM for the purpose of storing unique identifier information (ID) of the aforementioned noncontact tag 100 and information received from the reader/writer 200, et cetera.

The logic circuit 12 controls the nonvolatile memory 13 and processes transmission and receiving data exchanged with the reader/writer 200.

The logic circuit 12 includes a counterpart 12a, a decoding part 12b and a data processing part 12c.

The counterpart 12a is a counter incremented by a division clock 7 input from the clock division circuit 6.

The decoding part 12b carries out the decoding processing for obtaining digital information included in the carrier 400 based on a demodulated signal 9 input from the demodulation circuit 8 and a counter value 12a-1 of the counter part 12a.

The present embodiment is configured to input a demodulated signal 9 output from the demodulation circuit 8 also to the clock division circuit 6 so as to control the operation thereof.

FIG. 5 exemplifies operations of the clock extraction circuit 4, clock division circuit 6 and demodulation circuit 8 synchronously with a modulation wave form of the carrier 400.

The present embodiment is configured such that the demodulated signal 9 which is an output of the demodulation circuit 8 is a logic signal so as to output H level at the time of a non-modulation, and L level at the time of a demodulation, of the carrier 400 from the reader/writer 200.

The demodulation circuit 8 outputs a demodulated signal 9 at the H level at the time of a non-modulation (i.e., a non-modulation period 400b) of the carrier 400 from the reader/writer 200. The clock extraction circuit 4 extracts a 13.56 MHz clock signal as an extraction clock 5 from the carrier 400. The clock division circuit 6 divides the extraction clock 5 of 13.56 MHz to output a division clock 7 that is a desired clock. This operation is the same for both the ASK 100% modulation and ASK 10% modulation.

Having received the carrier 400 (i.e., modulated data) from the reader/writer 200, the demodulation circuit 8 demodulates the modulated data to output the demodulated signal 9 at L level during a modulation period 400a.

The carrier 400 is to stop at the time of an ASK 100% modulation, hence stopping an extraction clock 5 that is an output of the clock extraction circuit 4. In this event, an output value of the extraction clock 5 may stop at the H level, or L level, whose state is not important.

At the time of the ASK 10% modulation, the clock extraction circuit 4 continues to output the extracted extraction clock 5 of 13.56 MHz likewise at the time of a non-modulation.

Regardless of an ASK 100% modulation or ASK 10% modulation, the clock division circuit 6 resets the division clock 7 output from the clock division circuit 6 by having received the demodulated signal 9 at the L level. An output of the division clock 7 which is output from the clock division circuit 6 at the time of the resetting can be set either at an H level or L level by matching with an operation of the noncontact tag 100.

As the carrier 400 from the reader/writer 200 reverts back to a non-modulation state (i.e., a non-modulation period 400b), the demodulated signal 9 out of the demodulation circuit 8 accordingly becomes the H level.

The clock extraction circuit 4, since it is in a non-modulation state, extracts the extraction clock 5 of 13.56 MHz to output to the clock division circuit 6. As the demodulated signal 9 out of the demodulation circuit 8 transits to the H level, the clock division circuit 6 once again divides the extraction clock 5 into a desired division clock 7 to output to the logic circuit 12. The division clock 7 is to be subjected to a synchronous setting vis-à-vis the extraction clock 5 at every time the demodulated signal 9 transits to the H level.

This operation is the same for both the ASK100% modulation and ASK 10% modulation. The demodulated signal 9 resetting the clock division circuit 6 at the time of a modulation (i.e., a modulation period 400a) for receiving data results in inputting, into the decoding part 12b of the logic circuit 12, the same division clock 7 and demodulated signal 9 which are independent of a modulation index, thereby enabling one decoding part 12b to process data of both of the modulation index.

The above described operation eliminates a necessity of compensating for an extraction clock 5 at the time of stopping the carrier 400 (i.e., a modulation period 400a) from the reader/writer 200 by using a PLL, et cetera, and enables supply of a received signal with the same relationship between the demodulated signal 9 and division clock 7 independent of a modulation index to the logic circuit 12 and accordingly a decoding processing.

Let it show a demodulating operation of a noncontact tag 100 in the case of the ISO 15693 which supports both the ASK 100% modulation and ASK 10% modulation at the carrier 400 in the following. The configuration of the noncontact tag 100 is as shown by the above described FIG. 7.

The clock extraction circuit 4 extracts a clock necessary for an operation of the noncontact tag 100 from the carrier 400 (i.e., 13.56 MHz).

A clock (i.e., a main clock) used by the logic circuit 12 utilizes the division clock 7 divided by the clock division circuit 6 which divides the extraction clock 5 output from the clock extraction circuit 4.

The demodulated signal 9 output from the demodulation circuit 8 is configured to transit to the H level at the time of non-modulation and L level at the time of modulation (i.e., at a data receiving).

Here, let it show some examples of concrete configurations of the clock division circuit 6.

As exemplified by FIG. 8A, the clock division circuit 6 according to the present embodiment includes a flip-flop 61 (FF) and a logic gate 62.

The FF 61 comprises a clock input terminal CK, a D input terminal D, a Q output terminal Q, an XQ output terminal XQ, an enable input terminal EN, and a reset input terminal CL.

The XQ output terminal XQ outputs a logic signal inverting the logic of the Q output terminal Q.

An extraction clock 5 is input to the clock input terminal CK. An output of the XQ output terminal XQ is fed back to the D input terminal D and then a division clock 7 is output from the Q output terminal Q synchronously with the extraction clock 5 which is input to the clock input terminal CK.

The enable input terminal EN controls an applicability/inapplicability of a division operation of the FF 61 according to a logic signal (i.e., an enable signal 21) input to the aforementioned enable input terminal EN.

The reset input terminal CL initializes the internal states of the FF 61 by a logic signal (i.e., a reset signal 22) externally input to the aforementioned reset input terminal CL.

In the case of FIG. 8A, the logic gate 62 performs a logic operation of the demodulated signal 9 and the enable signal 21 input to the enable input terminal EN of the FF 61 within the clock division circuit 6 and inputs, to the enable input terminal EN, an enable signal 21a that is a logic signal as a result of the aforementioned logic operation.

The operating function of the logic gate 62, which performs a logic operation of the enable signal 21 and demodulated signal 9, controls a logic state of the enable signal 21a, to output to the enable input terminal EN, so as to stop a division operation of the FF 61 when the demodulated signal 9 is at the L level and also to set the division clock 7 which is an output from the Q output terminal Q of the FF 61.

When the demodulated signal 9 becomes the L level (i.e., a modulation period 400a) as a result of the above described configuration receiving modulated data (i.e., a carrier 400), the clock division circuit 6 stops dividing and resets the division clock 7 at the L level (or the H level).

And, when the demodulated signal 9 becomes the H level (i.e., a non-modulation period 400b), the clock division circuit 6 once again divides the extraction clock 5, which is an output of the clock extraction circuit 4, and outputs the division clock 7 to the logic circuit 12. That is, a synchronism setting of the division clock 7 is carried out at every time the demodulated signal 9 transits to the H level.

Here, the present embodiment is configured to not reset as far as the clock extraction circuit 4 is at a timing of the demodulated signal 9 being at the L level. It is enough to reset at least a clock used by the logic circuit 12 (that is, the division clock 7 which is an output of the clock division circuit 6 in this example). If other analog circuit, et cetera, within the noncontact tag 100 do not use the extraction clock 5, the clock extraction circuit 4 may be reset. In case a reset is appropriate for the clock extraction circuit 4, a further reduction of power consumption is predictably possible at the time of receiving modulated data (i.e., a carrier 400).

FIG. 8B shows another example configuration of a clock division circuit 6. In the example shown by FIG. 8B, a demodulated signal 9 and a logic gate 62 control a reset signal 22, thereby controlling a start/stop of a division clock 7 according to a logic state of the demodulated signal 9.

That is, the logic gate 62 performs a logic operation of the demodulated signal 9 and reset signal 22 which have been input to the reset input terminal CL and inputs the output (i.e., a reset signal 22a) thereto, as shown by FIG. 8B.

As in the case of the above described FIG. 8A, when the demodulated signal 9 becomes the L level (i.e., a modulation period 400a), the clock division circuit 6 stops dividing and resets the division clock 7 to the L level (or H level). When the demodulated signal 9 becomes the H level (i.e., a non-modulation period 400b), once again outputs the division clock 7.

FIG. 8C exemplifies a yet another configuration of a clock division circuit 6. The case shown by FIG. 8C makes a logic gate 62 intervene on the feed back path from the XQ output terminal XQ to the D input terminal D and controls a feed back signal from the XQ output terminal XQ to the D input terminal D according to a logic state of the demodulated signal 9.

That is, the logic gate 62 performs a logic operation of the XQ output from the XQ output terminal XQ and the demodulated signal 9 to input to the D input terminal D in the example shown by FIG. 8C. That the logic gate 62 having a logic configuration of stopping an input to the D input terminal D when the demodulated signal 9 becomes the L level makes it possible to output the division clock 7 as a fixed value of either the L level or H level during the time the demodulated signal 9 being at L level (i.e., a modulation period 400a) as in the case of the above described FIGS. 8A and 8B.

The configurations of the clock division circuit 6 shown by the above described FIGS. 8A, 8B and 8C obtain the wave forms of the division clock 7 as shown by FIGS. 6A and 6B, with FIG. 6A showing a wave form at the time of the ASK 100% modulation and FIG. 6B showing the one at the time of the ASK 10% modulation.

The respective wave forms are, from the top, a modulated carrier wave form (i.e., a carrier 400) from the reader/writer 200, an analog demodulated wave form 401 (i.e., a demodulated signal 9) which is demodulated from the modulated carrier wave form, and the division clock 7 divided from the extraction clock 5, as with the above described FIGS. 2A and 2B.

Since the division clock 7 is reset by detecting the L level of the demodulated signal 9 (i.e., a modulation period 400a), the division clock 7 is stopped at the time of receiving modulated data (i.e., during a modulation period 400a of the carrier 400) as with the ASK 100% modulation even in the case of the ASK 10% modulation in which the extraction clock 5 is not interrupted during a modulation period 400a.

This makes the relationship of the demodulated data (i.e., a demodulated signal 9) with the division clock 7 for driving the counter part 12a, thereby enabling the logic circuit 12 to carry out a common decoding processing based on a counter value 12a-1 of the counter part 12a independent of a modulation index.

When receiving data at the time of the ASK 100% modulation, the carrier 400 stops and therefore an extraction of the extraction clock 5 becomes impossible, hence stopping the division clock 7 as well. Consequently, the wave form shown by FIG. 6A is obtained. However, it is preferable to reset the division clock 7 when the demodulated signal 9 transits to the L level and start an operation of the clock division circuit 6 when the demodulated signal 9 transits to the H level also at the time of receiving data of the ASK 100% modulation as with the ASK 10% modulation shown by FIG. 6B. This is for synchronizing the division clock 7 at every time the modulated data is received, and it is preferable to make the same operation independent of a modulation index.

Figure 3:
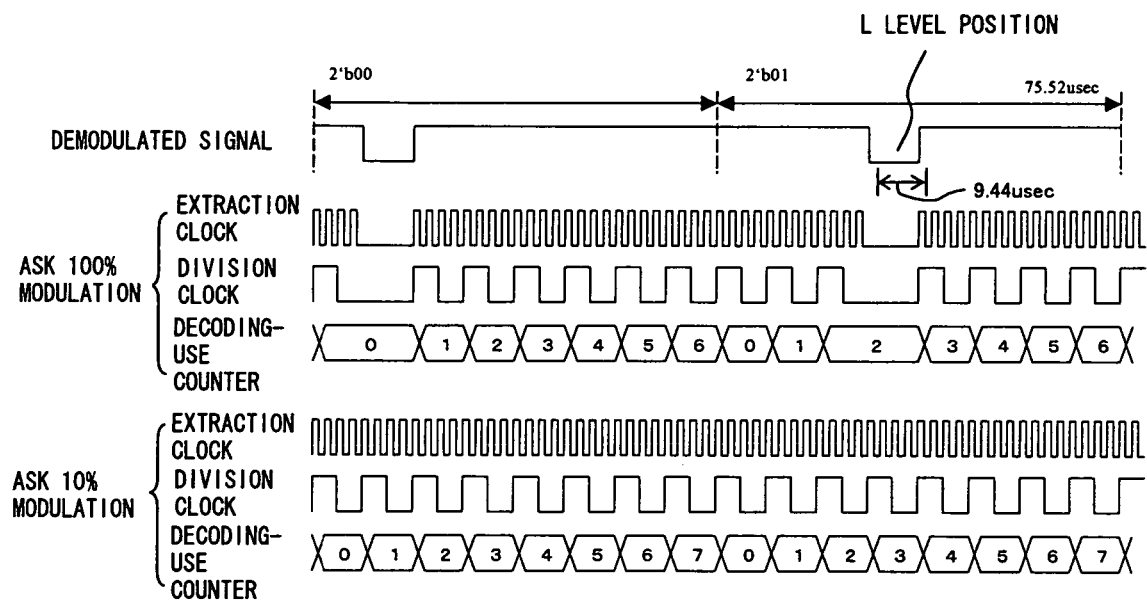
FIG. 3 is a timing chart showing an operation of a conventional noncontact tag in a pulse pause encoding.
Figure 4:
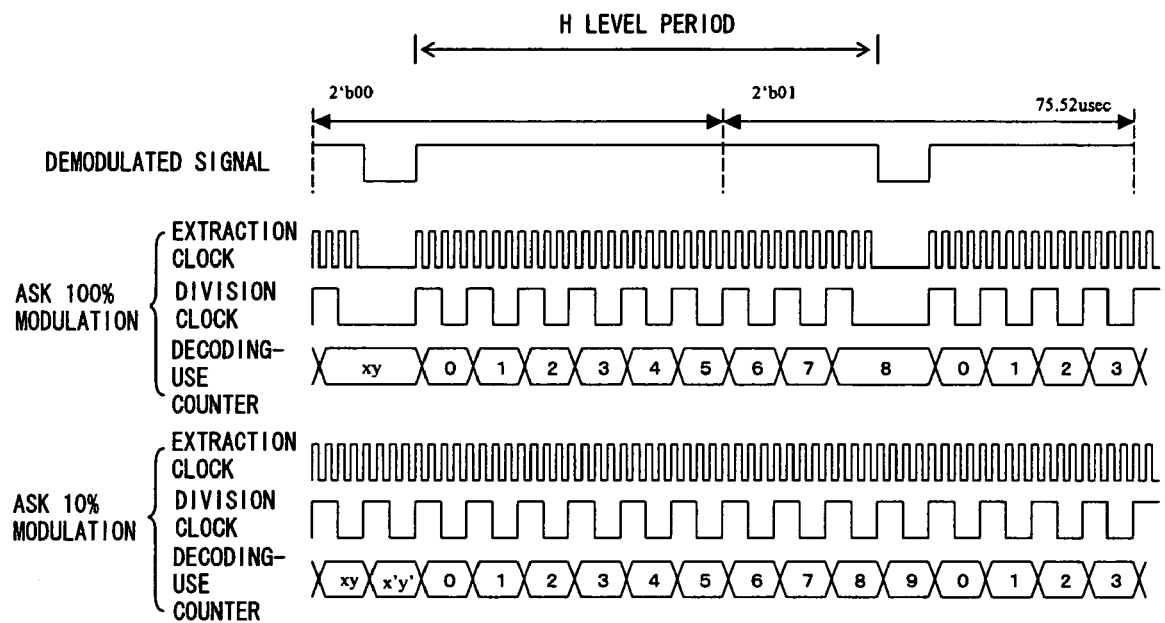
FIG. 4 is a timing chart exemplifying an operation of a conventional noncontact tag in a pulse pause encoding.
Figure 10:
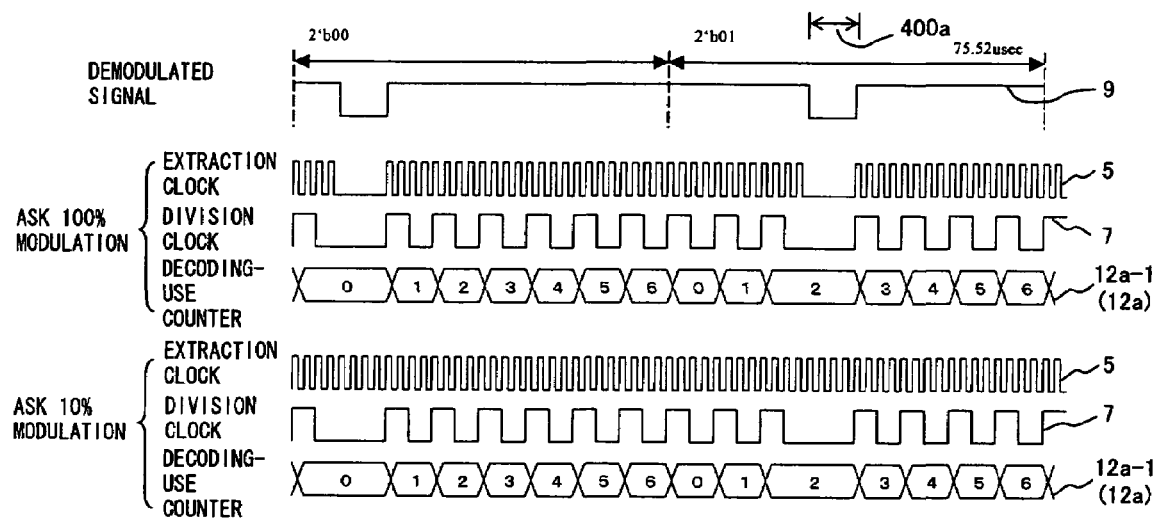
FIG. 10 is a timing chart exemplifying an operation of a noncontact tag in a pulse pause encoding according to an embodiment of the present invention.
Figure 11:
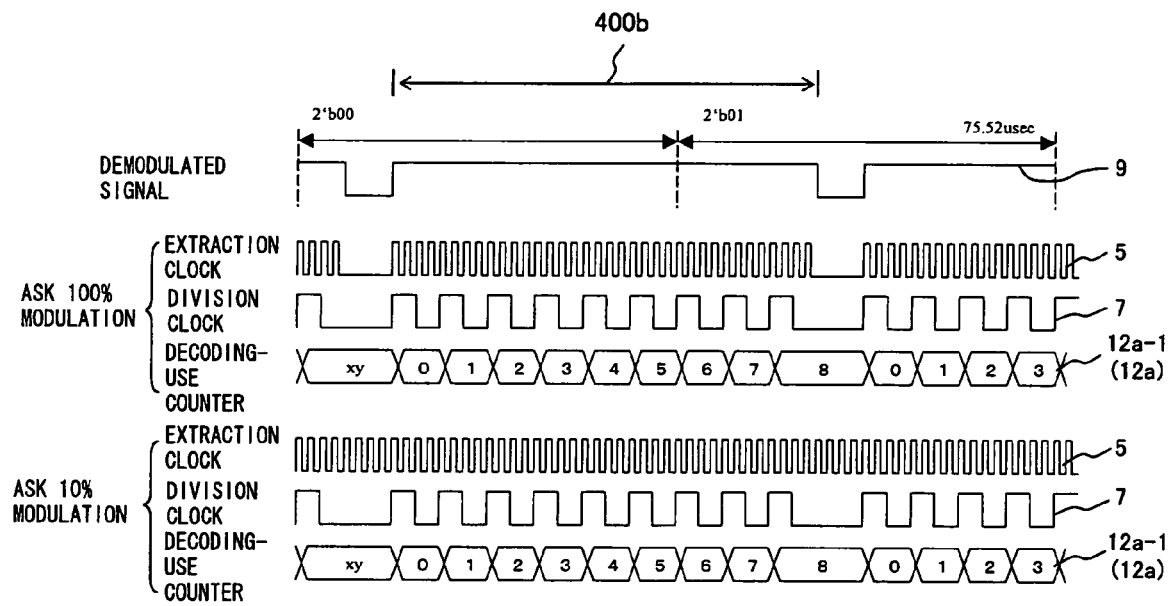
FIG. 11 is a timing chart exemplifying an operation of a noncontact tag in a pulse interval encoding according to an embodiment of the present invention.

When the thus operating noncontact tag 100 according to the present embodiment decodes the carrier 400 which is compliant to the above described ISO 15693 that supports both the ASK 100% modulation and ASK 10% modulation, the wave form, shown by FIG. 3, per the above described conventional technique becomes as shown by FIG. 10 (per the present embodiment); and the one, shown by FIG. 4, per the conventional technique becomes as shown by FIG. 11 (per the present embodiment).

That is, FIG. 10 shows the case of decoding (and encoding) based on the position of a modulation period 400a (i.e., the demodulated signal 9 is at the L level) within a data frame of 75.52 microseconds (i.e., 9.44 multiplied by 8) for the carrier 400. For example, a pulse pause encoding (i.e., 1 out of 4, 1 out of 256 per ISO 15693) is known as such a system.

In this case, 2-bit data is allocated to each data frame, each encoding method is the same as shown by the above described FIG. 1. Four kinds of bit patterns, i.e., 2'b00 through 2'b11, correspond to 0, 2, 4 and 6 of the three-bit width counter value 12a-1, respectively, the decoding part 12b decodes based on the position of the L level of the demodulated signal 9 within a data frame based on the aforementioned correlation.

As shown by FIG. 10, the present embodiment is configured so that the division clock 7, that is, the operating state of the counter value 12a-1 becomes the same between the case of the ASK 100% modulation in which the carrier 400 (i.e., the extraction clock 5) is interrupted during a modulation period 400a and the case of the ASK 10% modulation in which the carrier 400 (i.e., the extraction clock 5) is not interrupted during a modulation period 400a.

By this configuration, a decoding result based on the position of the demodulated signal 9 being at the L level (i.e., the modulation period 400a) within a data frame of the 75.52 microseconds (i.e., 9.44 multiplied by 8) is the same between the case of the ASK 100% modulation and that of the ASK 10% modulation.

As shown by FIG. 11, the result is the same by a decoding (and encoding) method based on a period of the demodulated signal 9 of the carrier 400 being at the H level (i.e., the non-modulation period 400b), that is, based on the interval of the adjacent two modulation periods 400a in the front and back. Also in this case, a value of the division clock 7 (i.e., a counter value 12a-1) for counting the interval of the adjacent two modulation periods 400a in the front and back becomes the same between the case of the ASK100% modulation and that of the ASK10% modulation, and therefore a decoding result based on the period of the demodulated signal 9 being at the H level becomes the same between the case of the ASK 100% modulation and that of the ASK 10% modulation.

As described above, the present embodiment is configured to make the operations of the demodulated signal 9 and the decoding-use counter part 12a (i.e., the division clock 7) in data of either modulation index between the ASK 100% modulation and ASK 10% modulation.

Therefore, the same decoding part 12b is enabled for a demodulation and a decoding processing independent of an encoding (and decoding) method or a modulation index in the carrier 400.

As described thus far, the present embodiment eliminates a necessity of equipping a clock generation circuit such as a PLL for compensating an interruption of the extraction clock 5 which is extracted from the carrier 400, and accomplishes a reduction of a chip area size, power consumption, et cetera, of an LSI chip constituting a noncontact tag 100.

A decoding processing of data of the ASK 100% modulation and ASK 10% modulation becomes exactly the same, eliminating a necessity of equipping the demodulation circuit 8 multiply by each of different modulation systems, and accomplishes a reduction of a chip area size, power consumption, et cetera, of an LSI chip constituting a noncontact tag 100.

This results in reducing a production cost of the noncontact tag 100.

Even if there are different modulation methods in a single standard due to a history of popularization or a related regulation of the noncontact tag 100 and if there is a necessity of selectively using different modulation systems according to the production time periods or usage regions (e.g., per country) of the reader/writer 200, the noncontact tag 100 according to the present embodiment is capable of responding to a plurality of modulation systems, as is, without putting a production cost or a performance such as power consumption (i.e., a communication distance) at risk by complicating an internal circuit as with the conventional method.

As a result, it is possible to popularize in the international market of the noncontact ID identification system without being conscious of a production time period of the reader/writer 200.

Meanwhile, since the carrier 400 is modulated at the time of receiving a command from the reader/writer 200, the carrier 400 is interrupted or a modulation period 400a with reduced amplitude is extended, resulting in reducing a received power available at the power generation circuit 3. In such an event, the present embodiment is configured to stop the division clock 7 during the modulation period 400a (i.e., the demodulated signal 9 at the L level), thereby accomplishing a low power consumption of the noncontact tag 100 at the time of receiving.

In other words, the present embodiment is capable of extending a communicable distance between the noncontact tag 100 and reader/writer 200 by reducing the power consumption of the noncontact tag 100 as described above, thereby extending an applicable range of the noncontact tag 100 and the noncontact ID identification system using the noncontact tag 100 according to the present embodiment.

Note that it goes without saying that the present invention can be changed variously within the scope thereof in lieu of being limited to the configurations exemplified for the above described embodiments.

For example, the present invention can be applied to a transponder of a noncontact IC card, et cetera, in place of the noncontact tag such as an RFID tag, et cetera.

The present invention enables reduction of a power consumption of a noncontact tag at the time of receiving modulated data which is attached to a carrier.

The present invention also makes it possible to demodulate modulated data of different modulation systems without ushering in an increased circuit size or a reduced communication distance for a noncontact tag.

What is claimed is:

1. A noncontact tag, comprising:
   a clock extraction unit for extracting a clock from a received carrier wave;
   a demodulation unit for outputting a demodulated signal comprising a logic signal whose logic state changes responding to each of a non-modulation period and modulation period of the carrier wave;
   a division unit for generating a division clock from the clock input from the clock extraction unit and also restraining the division clock from being output according to a logic state of the demodulated signal; and
   a decoding unit for decoding information included in the carrier wave by using a value of counter driven by the division clock.

2. The noncontact tag according to claim 1, wherein said decoding unit decodes said information by detecting a position of said modulation period in a data frame of a predetermined time width by said counter value.

3. The noncontact tag according to claim 1, wherein said decoding unit decodes said information by detecting a length of said non-modulation period by said counter value.

4. The noncontact tag according to claim 1, wherein said carrier wave carries said information by either a modulation factor 100% or a modulation factor 10%, and transitions of said counter values identify with each other in the modulation factor 100% and modulation factor 10% for the same information.

5. The noncontact tag according to claim 1, wherein said carrier wave carries said information by either a 100% amplitude modulation or 10% amplitude modulation, and restrains said division clock from outputting during a period of an amplitude being modulated by the 100% amplitude modulation and during a period of an amplitude being modulated by the 10% amplitude modulation.

6. The noncontact tag according to claim 1, wherein said division unit comprises a flip-flop, by receiving said clock as an input, for outputting said division clock from a Q terminal by feeding back an output from an XQ terminal to a D terminal, and an logic gate for inputting to an enable (EN) terminal of the flip-flop by carrying out an logic operation of said demodulated signal and enable signal; and
   makes the division clock stopped according to a logic state of the demodulated signal.

7. The noncontact tag according to claim 1, wherein said division unit comprises a flip-flop, by receiving said clock as an input, for outputting said division clock from a Q terminal by feeding back an output from an XQ terminal to a D terminal, and an logic gate for inputting to a clear (CL) terminal of the flip-flop by carrying out an logic operation of a clear signal of the flip-flop and said demodulated signal; and
   makes the division clock stopped according to a logic state of the demodulated signal.

8. The noncontact tag according to claim 1, wherein said division unit comprises a flip-flop, by receiving said clock as an input, for outputting said division clock from a Q terminal by feeding back an output from an XQ terminal to a D terminal, and an logic gate for inputting to a D terminal of the flip-flop by carrying out an logic operation of an output of the XQ terminal and said demodulated signal; and makes the division clock stopped according to a logic state of the demodulated signal.

9. The noncontact tag according to claim 1 is a passive type noncontact tag further comprising a rectifier unit for extracting a direct current from said carrier wave.

10. A control method for a noncontact tag, comprising the steps of extracting a clock from a received carrier wave;

outputting a demodulated signal comprising a logic signal whose logic state changes responding to each of a non-modulation period and modulation period of the carrier wave;

restraining the division clock from being output according to a logic state of the demodulated signal when generating a division clock from the clock input from a clock extraction unit; and decoding information included in the carrier wave by using a count value of the division clock.

11. The control method for a noncontact tag according to claim 10, wherein said step of decoding said information is to decode the information by detecting a position of said modulation period within a data frame of a predetermined time width by said count value.

12. The control method for a noncontact tag according to claim 10, wherein said step of decoding said information is to decode the information by detecting a length of said modulation period by said count value.

13. The control method for a noncontact tag according to claim 10, wherein said carrier wave carries said information by either a 100% modulation factor or a 10% modulation factor, and transitions of said counter values identify with each other in the modulation factor 100% and modulation factor 10% for the same information in said step of decoding said information.

14. A noncontact ID identification system including an access apparatus for transmitting command information by way of an ASK modulated carrier wave and a noncontact tag for responding to the access apparatus with identifier information by receiving the command information, wherein the noncontact tag includes a clock extraction unit for extracting a clock from the carrier wave received from the access apparatus;

a demodulation unit for outputting a demodulated signal comprising a logic signal whose logic state changes responding to each of a non-modulation period and modulation period of the carrier wave;

a division unit for generating a division clock from the clock input from the clock extraction unit and also restraining the division clock from being output according to a logic state of the demodulated signal; and a decoding unit for decoding information included in the carrier wave by using a value of counter driven by the division clock.

15. The noncontact ID identification system according to claim 14, wherein said access apparatus transmits said command information by modulating said carrier wave by a modulation factor 100% or modulation factor 10%.

16. The noncontact ID identification system according to claim 14, wherein said decoding unit decodes the information by detecting a position of said modulation period within a data frame of a predetermined time width by said count value.

17. The noncontact ID identification system according to claim 14, wherein said decoding unit decodes said information by detecting a length of said non-modulation period by said counter value.

* * * * *